(12) United States Patent
Soma et al.

(10) Patent No.: US 11,943,006 B2
(45) Date of Patent: Mar. 26, 2024

(54) WIRELESS COMMUNICATION SYSTEM USING A LEAKY TRANSMISSION LINE FOR DIRECT TWO-WAY COMMUNICATION AND USABLE IN A FLYING OBJECT

(71) Applicant: MITSUBISHI HEAVY INDUSTRIES, LTD., Tokyo (JP)

(72) Inventors: Fumihito Soma, Tokyo (JP); Takuya Koyama, Tokyo (JP); Hidenobu Uda, Tokyo (JP); Takeo Umemura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 707 days.

(21) Appl. No.: 16/975,516

(22) PCT Filed: Oct. 16, 2018

(86) PCT No.: PCT/JP2018/038480
§ 371 (c)(1),
(2) Date: Aug. 25, 2020

(87) PCT Pub. No.: WO2019/167333
PCT Pub. Date: Sep. 6, 2019

(65) Prior Publication Data
US 2021/0036430 A1    Feb. 4, 2021

(30) Foreign Application Priority Data

Feb. 27, 2018    (JP) .................. 2018-033872

(51) Int. Cl.
*H04B 5/00*     (2006.01)
*H01Q 1/32*     (2006.01)
*H01Q 1/52*     (2006.01)
*H01Q 13/20*    (2006.01)
*H01Q 21/00*    (2006.01)
*H04B 7/145*    (2006.01)
*H04W 4/48*     (2018.01)

(52) U.S. Cl.
CPC ............ *H04B 5/0018* (2013.01); *H01Q 1/32* (2013.01); *H01Q 1/526* (2013.01);
(Continued)

(58) Field of Classification Search
CPC . H01Q 13/203; H01Q 21/0043; H04B 5/0018
(Continued)

(56) References Cited

U.S. PATENT DOCUMENTS 4,152,648 A * 5/1979 Delogne .............. H04B 5/0018
                                                    455/523
6,219,553 B1 * 4/2001 Panasik .................... G09B 5/14
                                                    455/446
(Continued)

FOREIGN PATENT DOCUMENTS

JP        5627540         3/1981
JP     2007-134642        5/2007
(Continued)

OTHER PUBLICATIONS

English translation of the International Preliminary Report on Patentability dated Sep. 3, 2020 in International Patent Application No. PCT/JP2018/038480.
(Continued)

*Primary Examiner* — Benny T Lee
(74) *Attorney, Agent, or Firm* — Wenderoth, Lind & Ponack, L.L.P.

(57) ABSTRACT

A wireless communication system including a shield room forming section, leaky transmission line, first antenna, first device, second antenna and second device. The shield room forming section covers an internal space with an electromagnetic wave reflector that blocks wireless communication. The leaky transmission line is provided with first and second leakage parts arranged inside the shield room forming section. The first antenna is arranged inside the shield
(Continued)

room forming section and configured to be wirelessly communicable with the first leakage part. The first device is arranged inside the shield room forming section and has the first antenna. The second antenna is arranged inside the shield room forming section and configured to be wirelessly communicable with the second leakage part. The second device is arranged inside the shield room forming section and has the second antenna. The first device and the second device perform direct two-way wireless communication with each-other.

13 Claims, 6 Drawing Sheets

(52) U.S. Cl.
CPC ....... *H01Q 13/203* (2013.01); *H01Q 21/0043* (2013.01); *H04B 7/145* (2013.01); *H04W 4/48* (2018.02)

(58) Field of Classification Search
USPC .......................................... 333/237
See application file for complete search history.

(56) References Cited

U.S. PATENT DOCUMENTS

| | | | |
|---|---|---|---|
| 7,302,228 B2* | 11/2007 | Matsushita | H01Q 13/203 455/41.1 |
| 9,362,605 B2 | 6/2016 | Shinoda et al. | |
| 2007/0176840 A1* | 8/2007 | Pristas et al. | H01Q 13/203 343/791 |
| 2009/0052386 A1 | 2/2009 | Higashida | |
| 2011/0037670 A1* | 2/2011 | Terahara | H01Q 13/203 343/737 |
| 2011/0234338 A1* | 9/2011 | Takahashi | H04B 7/0413 333/237 |
| 2013/0170448 A1 | 7/2013 | Higashida | |
| 2014/0153655 A1* | 6/2014 | Abe et al. | H04B 3/54 375/257 |
| 2014/0167882 A1 | 6/2014 | Shinoda et al. | |

FOREIGN PATENT DOCUMENTS

| | | |
|---|---|---|
| JP | 2008-283508 | 11/2008 |
| JP | 4657332 | 3/2011 |
| JP | 2015-080310 | 4/2015 |
| JP | 5695744 | 4/2015 |
| JP | 2016-028534 | 2/2016 |
| JP | 2016-217711 | 12/2016 |
| WO | 2004/073199 | 8/2004 |
| WO | 2008/004577 | 1/2008 |

OTHER PUBLICATIONS

International Search Report dated Dec. 25, 2018 in International (PCT) Application No. PCT/JP2018/038480.

Extended European Search Report dated Mar. 9, 2021 in corresponding European Patent Application No. 18908109.4.

\* cited by examiner

WIRELESS COMMUNICATION SYSTEM USING A LEAKY TRANSMISSION LINE FOR DIRECT TWO-WAY COMMUNICATION AND USABLE IN A FLYING OBJECT

TECHNICAL FIELD

The present invention relates to a wireless communication system and a flying object equipped with the wireless communication system.

BACKGROUND ART

A technique of performing a wireless communication in a shield room by use of a leaky transmission line such as a leaky coaxial cable and a leaky waveguide is known. Herein, a shield room refers to a space where a wireless communication by use of an electromagnetic wave is difficult or impossible between inside and outside of the space, such as a narrow space and a closed space. In addition, a wireless communication by an electromagnetic wave may be difficult or impossible in an internal space of a shield room as well. According to these techniques, a distribution of an electromagnetic wave in a narrow space can be made uniform by use of a leaky transmission line as an antenna connected to an access point, in a room, in a space inside a tunnel or the like.

On the other hand, there is a need for a wireless communication performed between a plurality of devices arranged inside one or more shield rooms. In particular, there is a need for a wireless communication performed directly and mutually between a plurality of devices without using any access point that may be a base unit.

For example, to perform a wired communication between two devices arranged at a front and a rear of a flying object, it is necessary to provide a communication line there between. At that time, the communication line may need to detour around components arranged there between, such as a fuel tank or an engine, and the communication line may need to pass outside the flying object in this purpose. However, a surface of a flying object is exposed to high temperatures when the flying object is flying at high speed. In addition, the flying object is exposed outside itself to external electromagnetics noises as well. In addition, there is a case where, even though two devices try to perform a wireless communication with each other, as a space where each device is arranged is covered with an electromagnetic wave reflector, the wireless communication cannot be performed.

In relation to the above, a description related to a wireless communication is disclosed in Patent Literature 1 (WO 2008/004577 A1). This wireless communication system is provided with a plurality of wireless stations provided in a structure with a radio wave shield arranged at a fixed position. This wireless communication system is characterized in that at least one of a pair of wireless stations having an identical radio channel and a pair of wireless stations having another radio channel adjacent to each other is arranged on both sides of the radio wave shield.

The wireless communication system in Patent Literature 1 (WO 2008/004577 A1) is a technology for optimizing arrangement of wireless stations considering electromagnetic wave reflectors and absorbers, in wireless communication inside an aircraft. In other words, in the Patent Literature 1, a target thereof is limited to a wireless communication inside a single narrow space and no wireless communication across a plurality of closed spaces can be realized.

In addition, an invention related to a closed space transmitting apparatus is disclosed in Patent Literature 2 (Japanese Patent No. 4657332 B2). This closed space transmitting apparatus is provided with and consists of a leaky coaxial cable, a first means, a second means and a third means. Herein, the first means inputs an input signal to one terminal of the leaky coaxial cable. The second means changes over time at least one among amplitude, frequency, phase and delay time of a signal outputted from the other terminal of the leaky coaxial cable. The third means inputs the signal obtained from the second means that changes over time to the other end of the leaky coaxial cable. This closed space transmitting apparatus changes over time radiation characteristic or a radiation pattern of radio waves radiated from a leaky coaxial cable to inside a closed space surrounded by a radio wave reflector.

The closed space transmitting apparatus of the Patent Literature 2 (Japanese Patent No. 4657332 B2) is a technology for performing wireless communication by changing over time a radiation pattern of radio waves in a closed space so that no null point is generated due to an overlap of a direct wave and a reflected wave generated in the closed space. In other words, a target is a wireless communication in a narrow space and no wireless communication across a plurality of closed spaces can be realized.

In addition, an invention related to an electromagnetic wave propagation apparatus is disclosed in Patent Literature 3 (Japanese Patent No. 5695744 B2). This electromagnetic wave propagation apparatus is provided with a plurality of planar propagation media, a planar dielectric spacer and a first interface. Herein, the planar dielectric spacer is arranged in order to separate the plurality of planar propagation media from each other. The first interface performs transmission and reception of electromagnetic wave between the planar propagation media and a transceiver. Each planar propagation medium is constituted by superposing at least one planar conductor and at least one planar dielectric, respectively. Each planar propagation medium is arranged so as to have a portion superposed to at least one other planar propagation medium. An electromagnetic wave combining means that transmits and receives electromagnetic waves between planar propagation media is provided to the planar conductor in the superposed portion. A slot is provided to the planar conductor in the superposed portion as at least one of electromagnetic combining means. A distance from an end surface positioned in a propagation direction of electromagnetic waves in the planar propagation medium to the slot is arranged so as to be ¼ of an integer multiple of an efficient wavelength.

The electromagnetic wave propagation apparatus in the Patent Literature 3 (Japanese Patent No. 5695744 B2) is a technology of electromagnetic wave combination between propagation medium of electromagnetic waves by arrangement of propagation medium and shape and/or arrangement of slots. In other words, the Patent Literature 3 (Japanese Patent No. 5695744 B2) does not disclose or suggest any technical idea of electromagnetic wave combination between each antenna and propagation medium, and thus cannot realize a wireless communication in a shield room covered with an electromagnetic wave reflector.

In addition, a description related to a communication system between a mobile station and a fixed station is disclosed in Patent Literature 4 (Japanese Patent Publication No. 2016-217711 A). This communication system has a mobile station, that has a wireless communication function and can move to a two-dimensional or three-dimensional position, and a plurality of fixed stations, that have a wireless communication function and are fixed to predetermined two-dimensional or three-dimensional positions, measures intensity of radio waves in wireless communication between the mobile station and the fixed stations, determines a relevant station based on a result thereof and gives related information.

The communication system in the Patent Literature 4 (Japanese Patent Publication No. 2016-217711 A) is a technology for realizing a wireless communication by measuring an intensity of electromagnetic wave in a narrow space, selecting a radio station and reducing influences due to reflection and diffraction. In other words, a target thereof is a wireless communication in a narrow space and no wireless communication across a plurality of closed spaces can be realized.

CITATION LIST

Patent Literature

[Patent Literature 1] WO 2008/004577 A1, published January 2008
[Patent Literature 2] Japanese Patent No. 4657332 B2, published March 2011
[Patent Literature 3] Japanese Patent No. 5695744 B2, published April 2015
[Patent Literature 4] Japanese Patent Publication No. 2016-217711 A, published December 2016

SUMMARY OF THE INVENTION

A wireless communication system, in that a wireless communication can be performed directly and mutually between a plurality of communication devices arranged inside one or more shield room forming sections, and a flying object using this wireless communication system will be provided. Other problems and new features will be clarified by descriptions of the present Specification and attached drawings.

According to an embodiment, a wireless communication system is provided with a shield room forming section, a leaky transmission line, a first antenna, a first device, a second antenna and a second device. Herein, the shield room forming section covers an internal space as a shield room with an electromagnetic wave reflector that blocks wireless communication. The leaky transmission line is provided with a first leakage part and a second leakage part arranged inside the shield room forming section. It should be noted that the leaky transmission line may further have a non-leakage part from where no electromagnetic wave leaks. The first antenna is arranged inside the shield room forming section and is configured to be wirelessly communicable with the first leakage part. The first device is arranged inside the shield room forming section and has the first antenna. The second antenna is arranged inside the shield room forming section and is configured to be wirelessly communicable with the second leakage part. The second device is arranged inside the shield room forming section and has the second antenna. The first device and the second device perform a direct two-way wireless communication mutually and through the leaky transmission line. It should be noted that the first device and the second device may perform two-way wireless communication without using the leaky transmission line. The leaky transmission line may be a single path or may be branched into a plurality of paths.

According to an embodiment, a flying body is provided with a body, a leaky transmission line, a first antenna, a first device, a second antenna and a second device. Herein, the body covers an internal space with an electromagnetic wave reflector that blocks wireless communication. The leaky transmission line is provided with a first leakage part and a second leakage part arranged inside the body. The first antenna is arranged inside the body and is configured to be wirelessly communicable with the first leakage part. The first device is arranged inside the body and has the first antenna. The second antenna is arranged inside the body and is configured to be wirelessly communicable with the second leakage part. The second device is arranged inside the body and has the second antenna. The first device and the second device perform a direct two-way wireless communication through the leaky transmission line.

According the above-mentioned embodiment, a wireless communication system, in that a direct two-way wireless communication can be performed between a plurality of communication devices respectively arranged inside one or more shield room forming sections by providing a leaky transmission line passing through one or more shield rooms, and a flying body using this wireless communication system can be realized.

DETAILED DESCRIPTION OF THE EMBODIMENTS

Embodiments to carry out a wireless communication system and a flying object according to the present invention will be described below with reference to attached drawings. Herein, a flying object includes a manned or unmanned rocket, a missile, a manned or unmanned aircraft, an artificial satellite, and the like.

First Embodiment

A device that performs wireless communication may be arranged in a shield room covered with an electromagnetic wave reflector that blocks wireless communication using electromagnetic wave. A container that covers an internal space as a shield room will be referred to as "shield room forming section" for convenience. It should be noted that a shape of the shield room forming section is arbitrary. In addition, the internal space as the shield room of the shield room forming section may be completely closed, may have some gaps, and furthermore may include a mesh structure sized to block specific communication frequencies. In the present embodiment of wireless communication system, a leaky transmission line is used as a two-way transmission line of electromagnetic waves. That is, for example, a leaky transmission line is provided so as to pass through two shield rooms and a direct two-way wireless communication is performed through the leaky transmission line between two devices arranged inside respective shield rooms. Herein, it is to be noted that performing a two-way wireless communication without using any access point that mediates two devices is expressed as "direct".

Figure 1:
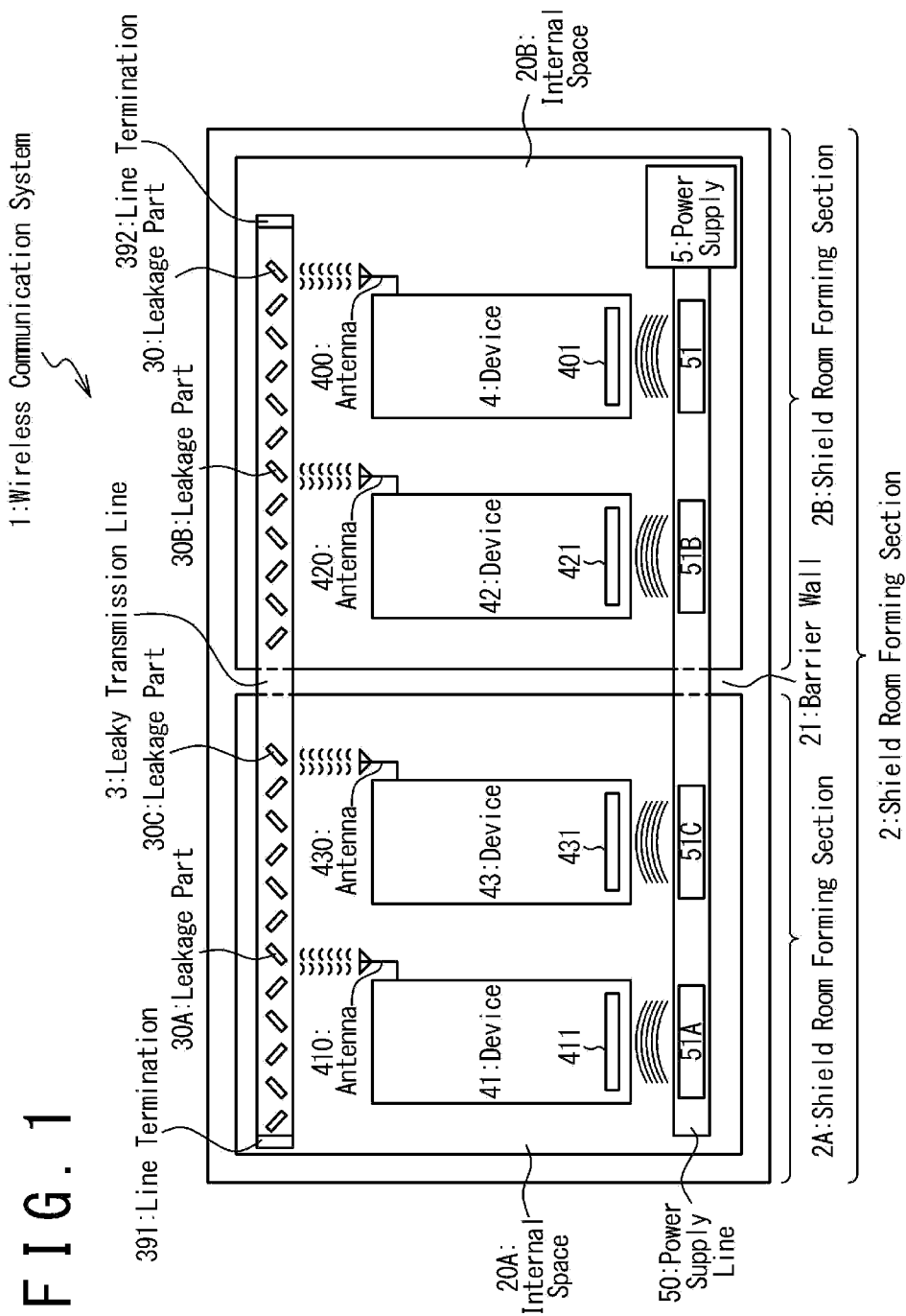
FIG. 1 is a partial cross-sectional view that shows a configuration example of a wireless communication system according to an embodiment.

A configuration example of a wireless communication system 1 according to an embodiment will be described with reference to FIG. 1. FIG. 1 is a partial cross-sectional view that shows a configuration example of a wireless communication system 1 according to an embodiment.

Components of the wireless communication system 1 in FIG. 1 will be described. The wireless communication system 1 is provided with a shield room forming section 2, a leaky transmission line 3, a plurality of devices 4, a power supply 5 and a power supply line 50. Herein, the shield room forming section 2 is provided with a first shield room forming section 2A, a second shield room forming section 2B and a barrier wall 21. The first shield room forming section 2A has a first internal space 20A therein. Similarly, the second shield room forming section 2B has a second internal space 20B therein. It should be noted that although a number of shield room forming sections 2A and 2B included in the shield room forming section 2 is two in the configuration example shown in FIG. 1, it may be three or more. It is needless to say that those numbers are merely examples and do not limit the present embodiment.

The leaky transmission line 3 is provided with a plurality of leakage parts 30, two ends and two line terminations 391 and 392. In other words, two ends of the leaky transmission line 3 are terminated by two line terminations 391 and 392, respectively. Herein, the plurality of leakage parts 30 include a first leakage part 30A, a second leakage part 30B and a third leakage part 30C. However, when these leakage parts 30A, 30B and 30C are not distinguished, they may be simply referred to as "leakage part(s)" 30. It should be noted that the leaky transmission line 3 may further have a non-leakage part from where no electromagnetic wave leaks.

Each of the plurality of devices 4 is provided with an antenna 400 and a wireless power receiving unit 401. The plurality of devices 4 includes a first device 41, a second device 42 and a third device 43. The first device 41 is provided with a first antenna 410 and a first wireless power receiving unit 411. Similarly, the second device 42 is provided with a second antenna 420 and a second wireless power receiving unit 421. In addition, the third device 43 is provided with a third antenna 430 and a third wireless power receiving unit 431. However, when these devices 41, 42 and 43 are not distinguished, they may be simply referred to as "device(s)" 4. Similarly, when these antennas 410, 420 and 430 are not distinguished, they may be simply referred to as "antenna(s)" 400. In addition, when these wireless power receiving units 411, 421 and 431 are not distinguished, they may be simply referred to as "wireless power receiving unit(s)" 401.

The power supply line 50 is provided with a plurality of wireless power supply units 51. The plurality of wireless power supply units 51 includes a first wireless power supply unit 51A, a second wireless power supply unit 51B and a third wireless power supply unit 51C. However, when these wireless power supply units 51A, 51B and 51C are not distinguished, they may be simply referred to as "wireless power supply unit(s)" 51. It should be noted that although there is a variety of power transmitting methods for wireless power supply, such as magnetic field coupling type, electric field coupling type and microwave type, the present embodiment is not limited by them and may be of any type of those methods. In addition, the power supply line 50 may be a single path or may be branched into a plurality of branch portions.

Connections and arrangement of components of the wireless communication system 1 in FIG. 1 will be described. In the configuration example in FIG. 1, the first shield room forming section 2A and the second shield room forming section 2B are connected by sharing a part of the respective outer walls. These shared outer walls are the barrier wall 21. In other words: the barrier wall 21 is provided inside the shield room forming section 2 to divide the internal space in the shield room forming section 2 into two spaces; a part of the shield room forming section 2 and the barrier wall 21 that covers the first internal space 20A as a first shield room that is one of the divided internal space is referred to as "the first shield room forming section" 2A; and a remaining part thereof that covers the second internal space 20B as a second shield room is referred to as "the second shield room forming section" 2B.

It should be noted that in the present embodiment, as a premise, each of the first internal space 20A covered by the first shield room forming section 2A and the second internal space 20B covered by the second shield room forming section 2B is a shield room blocked from electromagnetic waves and no wireless communication can be performed from one internal space to another internal space. Thus, the shield room forming section 2, the first shield room forming section 2A, the second shield room forming section 2B and the barrier wall 21 may be constituted of an electromagnetic wave reflector that reflects electromagnetic waves. At least, the first internal space 20A and the second internal space 20B that are covered by the first shield room forming section 2A and the second shield room forming section 2B, respectively, are preferably covered by an electromagnetic wave reflector. In addition, in this sense, the first shield room forming section 2A and the second shield room forming section 2B are not necessarily integrated and may exist separately and independently from each other. Furthermore, a combination of a plurality of shield room forming sections that are integrated and a combination of a plurality of shield room forming sections that are separated and independent from each other may simultaneously exist. At that time, the leaky transmission line 3 may have leakage parts 30 of a same number as the shield room forming sections 2A and 2B or more leakage parts 30 and may have branches. It is needless to say that all ends of the leaky transmission line 3 are preferably terminated by line terminations, respectively, even if the leaky transmission line 3 includes branches.

The leaky transmission line 3 may be constituted as a leaky waveguide or may be constituted as a leaky coaxial cable. In any case, a part of the leaky transmission line 3 is arranged inside the first shield room forming section 2A, that is, in a range of the first internal space 20A, and another part of the leaky transmission line 3 is arranged inside the second shield room forming section 2B, that is, in a range of the second internal space 20B. At that time, the leaky transmission line 3 may be arranged so as to penetrate through the barrier wall 21 as shown in FIG. 1. Alternatively, the leaky transmission line 3 may be arranged so as to detour around the barrier wall 21 (not shown). In addition, there may be a section of non-leakage part that does not radiate electromagnetic waves between each leakage part 30. The section of non-leakage part may be constituted as a waveguide or may be constituted as a coaxial cable.

A more specific configuration example of a case in which the leaky transmission line 3 is a leaky waveguide will be described. A general waveguide is a tubular metallic pipe able to propagate electromagnetic waves in longitudinal direction thereof and frequencies of electromagnetic waves with low propagation loss differ in accordance with cross-sectional shape, sizes or the like of the waveguide. A leaky waveguide is a waveguide provided with leakage parts on sides thereof and can radiate a part of electromagnetic waves propagating through the leakage parts. Conversely, a leaky waveguide can propagate electromagnetic waves, that penetrates through a leakage part, along a longitudinal direction. In general, a leakage part of a leaky waveguide is a long and narrow hole opened to penetrate through a side of a metallic pipe and is also referred to as "a slot". Frequencies, radiation directions and the like of electromagnetic waves that propagate along a leaky waveguide through a leakage part differ in accordance with shape, sizes and the like of the leakage part. It should be noted that in many cases a plurality of slots is provided to a leaky waveguide. In addition, in this sense, it may be considered that leakage parts of a leaky waveguide function as a plurality of antennas provided along the leaky waveguide.

A more specific configuration example of a case in which a leaky transmission line 3 is a leaky coaxial cable will be described. A general coaxial cable is a cable able to propagate electromagnetic waves in a longitudinal direction thereof, in which a circumference of a linear center conductor is covered by a cylindrical dielectric and a circumference of this dielectric is covered by a cylindrical external conductor. The external conductor is preferably further covered by a cylindrical jacket constituted of an insulator. A leaky coaxial cable is a coaxial cable provided with leakage parts on external conductor thereof and can radiate a part of electromagnetic waves propagating through leakage parts. Conversely, a leaky coaxial cable can propagate electromagnetic waves, that penetrates through leakage parts, along the longitudinal direction. In general, a leakage part of a leaky coaxial cable is a long and narrow hole opened to penetrate through the external conductor and is also referred to as "a slot". It should be noted that in many cases a plurality of slots are provided to a leaky coaxial cable. In addition, as another configuration example, a leaky coaxial cable with an external conductor wound in a spiral with gap around the dielectric also exists. In this case, the gap opened between the spiral external conductor functions as a leakage part. At that time, although the gap is actually constituted in a shape of one spiral, the leaky coaxial cable looks like a plurality of external conductors and a plurality leakage parts arranged alternatively from any point of view and the leaky coaxial cable functions such that a plurality of leakage parts actually exists. In addition, in this sense, it can be also considered that leakage parts of a leaky coaxial cable function as a plurality of antennas provided along the leaky coaxial cable.

In the configuration example in FIG. 1, the leaky transmission line 3 penetrates through the barrier wall 21 and partially penetrates inside the first shield room forming section 2A and inside the second shield room forming section 2B, respectively. The first device 41 including the first antenna 410 is further arranged inside the first shield room forming section 2A. Similarly, the second device 42 including the second antenna 420 is further arranged inside the second shield room forming section 2B, as well.

A device 4 is provided with an antenna 400 and a wireless power receiving unit 401. It should be noted that this means that, as described above, the devices 41, 42 and 43 are provided with the antennas 410, 420 and 430 and the wireless power receiving units 411, 421 and 431, respectively. Herein, in each device 4, the antenna 400 is connected to a communication circuit that is not illustrated. On the other hand, in each device 4, the antenna 400 is coupled by electromagnetic waves with any one(s) of the plurality of leakage parts 30 of the leaky transmission line 3. Herein, a coupling by electromagnetic waves means that the antenna 400 and the leakage section 30 are configured and arranged so as to be wirelessly communicable with each other. Herein, a leakage part 30 is in electromagnetic wave coupling with the antenna 410 of the first device 41 and will be referred to as "a first leakage part" 30A. Similarly, "a second leakage part" 30B and "a third leakage part" 30C are in electromagnetic wave coupling with the antenna 420 of the second device 42 and the antenna 430 of the third device 43, respectively. In the configuration example in FIG. 1, the first leakage part 30A and the third leakage part 30C of the leaky transmission line 3 are arranged inside the first shield room forming section 2A and at least the second leakage part 30B is arranged inside the second shield room forming section 2B.

The power supply line 50 is connected to the power supply 5 on one hand and is connected to the wireless power supply unit 51 on the other hand. Although in the configuration example in FIG. 1 the power supply 5 is arranged inside the second shield room forming section 2B, that is, in the second internal space 20B, this is merely a configuration example and does not limit the present embodiment. The power supply 5 may be arranged inside the first shield room forming section 2A, that is, in the first internal space 20A, or may be arranged outside the shield room forming section 2.

A part of the power supply line 50 is arranged inside the first shield room forming section 2A, that is, in the first internal space 20A. Another part of the power supply line 50 is arranged inside the second shield room forming section 2B, that is, in the second internal space 20B. At that time, the power supply line 50 may be arranged so as to penetrate through the barrier wall 21, as shown in FIG. 1. Alternatively, the power supply line 50 may be arranged so as to detour around the barrier wall 21.

The plurality of wireless power supply units 51 and the plurality of wireless power receiving units 401 are arranged so that the plurality of wireless power receiving units 401 can receive wireless power supply from the plurality of wireless power supply units 51, respectively. In other words, a positional relationship between the first wireless power supply unit 51A and the first wireless power receiving unit 411 is preferably determined so as to enable wireless power supply there between. Similarly, a positional relationship between the second wireless power supply unit 51B and the second wireless power receiving unit 421 is preferably determined so as to enable wireless power supply there between. In addition, a positional relationship between the third wireless power supply unit 51C and the third wireless power receiving unit 431 is preferably determined so as to enable wireless power supply there between. It should be noted that it is needless to say that the wireless power supply unit 51 is preferably arranged inside the electromagnetic wave reflector, that is, inside the shield room forming section 2.

Operations of components of the wireless communication system 1 in FIG. 1 will be described. At first, the power supply 5 generates a power to transmit to the wireless power supply unit 51 through the power supply line 50. Each wireless power supply unit 51 performs wireless power supply to the wireless power receiving units 401 arranged in a position enabling the wireless power supply. The wireless power receiving units 401 supply the power wirelessly supplied from the wireless power supply units 51 to internal circuits of the devices 4 that are not illustrated. These internal circuits include communication circuits. The internal circuits of the devices 4, that are not illustrated, start to operate by the power supplied from the wireless power receiving units 401. It should be noted that it is preferable that the devices 4 are further provided with rechargeable batteries, that are to be charged with the power supplied by the wireless power receiving units 401 and supply the charged power to the communication circuits, and charge-discharge circuits. The devices 4 in operation perform, as necessary, transmission and reception of signal through the antennas 400. The antennas 400 enable two-way communication with other devices 4 through the leakage parts 30 in electromagnetic wave coupling with the antennas 400 and the leaky transmission line 3.

Herein, it is to be noted that when performing wireless communications between a plurality of devices 4, the leaky transmission line 3 functions as a mere two-way propagation path. That is, in a conventional method of using a leaky transmission line 3, when performing wireless communication between a plurality of devices 4 in electromagnetic wave coupling with leakage parts 30 of a leaky transmission line 3, it was common that an access point connected to the leaky transmission line 3 by wire mediates this wireless communication. In other words, at first, one device 4 performs communication with the access point and then the access point performs communication with another device 4, and thus both devices 4 could perform communication with each other. However, in the present embodiment, even if two or more devices 4 are arranged in a same internal space or even if two or more devices 4 are arranged in a plurality of different internal spaces, respectively, a wireless communication can be performed directly between both devices 4. Specifically, in the configuration example in FIG. 1, a wireless communication can be performed directly even between a first device 41 arranged in the first internal space 20A and the second device 42 arranged in the second internal space 20B. In addition, a wireless communication can be directly performed between the first device 41 and the third device 43 that are arranged in the same first internal space 20A, as well.

It should be noted that it is needless to say that although a wireless power supply is used in the above description, a similar wireless communication can be performed by supplying the devices 4 with power by wire, as well. However, by realizing both wireless communication and wireless power supply, installation of the devices 4 in the shield room forming sections 2, assembly of the wireless communication system 1, and the like can be greatly simplified. This leads to improvement of productivity. In addition, by using common interfaces for wireless communication and wireless power supply between the plurality of devices 4, improvement in degree of freedom in combination of devices 4, expandability and the like can be expected as well.

Figure 2:
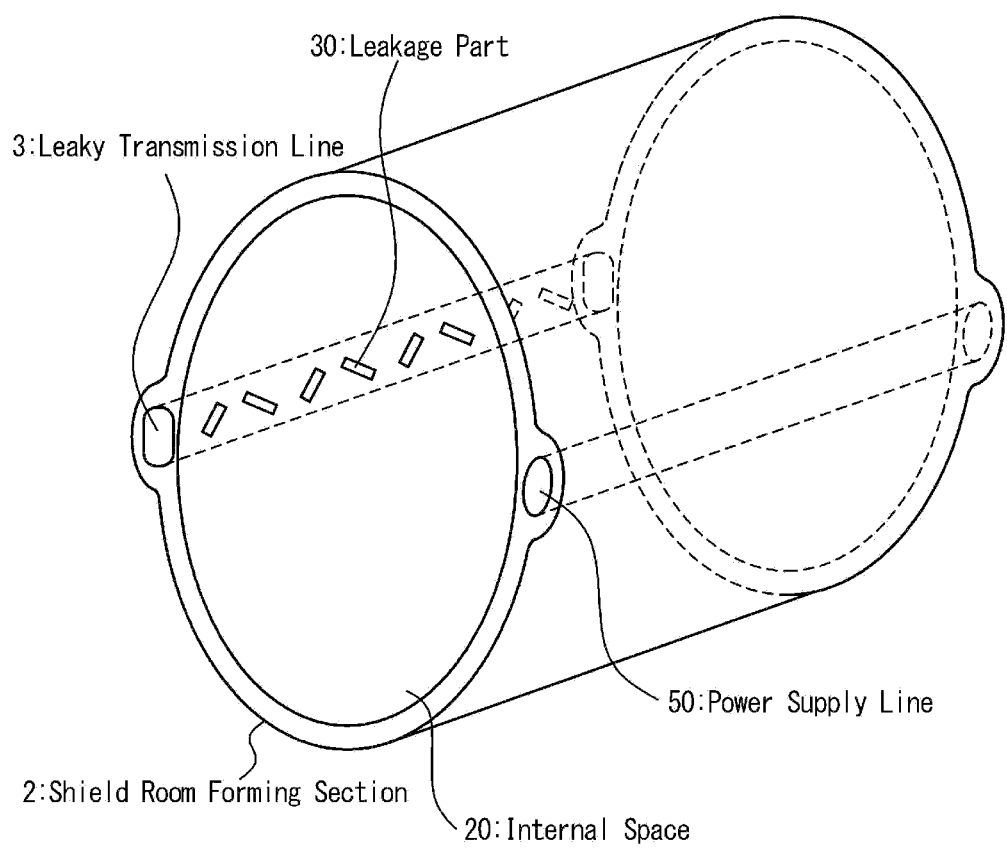
FIG. 2 is a partial cross-sectional view that shows another configuration example of a wireless communication system according to an embodiment.

A variation example of the present embodiment will be described with reference to FIG. 2. FIG. 2 is a partial cross-sectional view that shows another configuration example of a wireless communication system according to an embodiment. In the variation example shown in FIG. 2, the leaky transmission line 3 and the power supply line 50 are integrated to the shield room forming section 2. In addition, in FIG. 2, illustrations of devices 4 is omitted for a better visual recognition.

The leaky transmission line 3 in FIG. 2 is integrated to the shield room forming section 2, as described above. More specifically, the leaky transmission line 3 in FIG. 2 is a leaky waveguide and the metallic pipe thereof is integrated to the shield room forming section 2. Therefore, it is preferable that the entire shield room forming section 2 is made of metal. It should be noted that if the whole of the shield room forming section 2 is non-metallic, a metal film may be formed on a surface inside or outside the leaky waveguide. Herein, the leakage parts 30 are constituted as slots that penetrate through the shield room forming section 2 so that a hollow part of the leaky waveguide is connected to the internal space 20. Such a structure can be relatively easily manufactured by using techniques of so-called three-dimensional printers, for example.

It should be noted that in case of constituting the leaky transmission line 3 in the present variation example with a leaky coaxial cable, the following modification may be made, for example. The external conductor of the leaky coaxial cable is considered to be integrated to the shield room forming section 2 and the center conductor is arranged in a hollow part of the leaky waveguide in FIG. 2 so as not to be conductive with the shield room forming section 2. Furthermore, a remaining space of the hollow part between the center conductor and the shield room forming section 2 is filled with dielectric.

Detailed description about power supply line 50 is omitted because it is a well-known technique. It should be noted that in the configuration example in FIG. 2, since the shield room forming section 2 is made of metal, it can be used as a ground.

In the configuration example in FIG. 2, the leaky transmission line 3 and the power supply line 50 are arranged so as to protrude outside the shield room forming section 2 in order to make a shape of the internal space 20 cylindrical. However, this is a mere example and is not to limit a shape of the wireless communication system 1 according to the present embodiment.

Second Embodiment

Figure 3:
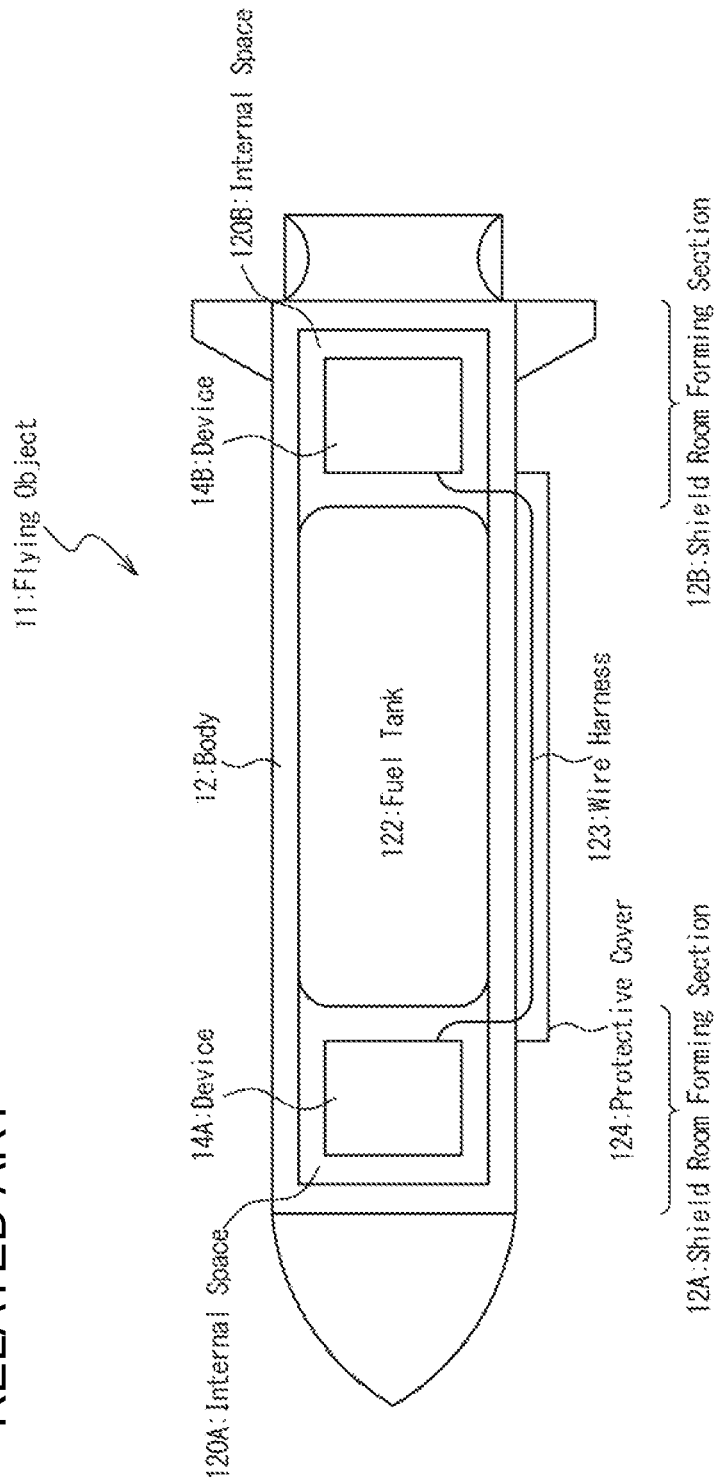
FIG. 3 is a partial cross-sectional view that shows a configuration example of a flying object according to a related art.

In the present embodiment, the configuration of the wireless communication system 1 according to the first embodiment will be applied to a configuration of a flying object. Although it is a repetition of the above described "Background Art", a configuration example of a flying object according to a related art will be described with reference to FIG. 3 at first for a better understanding of the present embodiment. FIG. 3 is a partial cross-sectional view that shows a configuration example of a flying object 11 according to a related art.

Components of the flying object 11 in FIG. 3 will be described. The flying object 11 in FIG. 3 is provided with a body 12, a fuel tank 122, a first device 14A, a second device 14B, a wire harness 123 and a protective cover 124.

Connection relationships and positional relationships of the components of the flying object 11 in FIG. 3 will be described. The fuel tank 122 is arranged inside the body 12. In the flying object 11, the existence of the fuel tank 122 is very important and in many cases a central part of the body 12 is occupied by the fuel tank 122. In addition, a high symmetry is required for the shape of the fuel tank 122.

Specifically, it is preferable that the shape of the fuel tank 122 is almost cylindrical. As a result, the internal space of the body 12 is physically divided by the fuel tank 122 into a first internal space 120A at the front and a second internal space 120B at the rear. Thus, a part of the body 12 and the fuel tank 122 that covers the first internal space 120A can be considered as a pseudo first shield room forming section 12A. Similarly, a part of the body 12 and the fuel tank 122 that covers the second internal space 120B can be considered as a pseudo second shield room forming section 12B. At that time, the first device 14A is arranged in the first internal space 120A and the second device 14B is arranged in the second internal space 120B.

The first device 14A and the second device 14B are electrically connected via the wire harness 123. The wire harness 123 that connects the first device 14A and the second device 14B is arranged outside the body 12 in order to detour around the fuel tank 122. The protective cover 124 to protect the wire harness 123 is provided on the outer surface of the flying object 11. This is because when the flying object 11 flies at high speed, high heat is generated on the outer surface of the body 12 due to aerodynamic heating and the wire harness 123 needs to be protected from this high heat. In addition, a performance of protecting the wire harness 123 from outside electromagnetic wave noises is also required of the protective cover 124.

Figure 4:
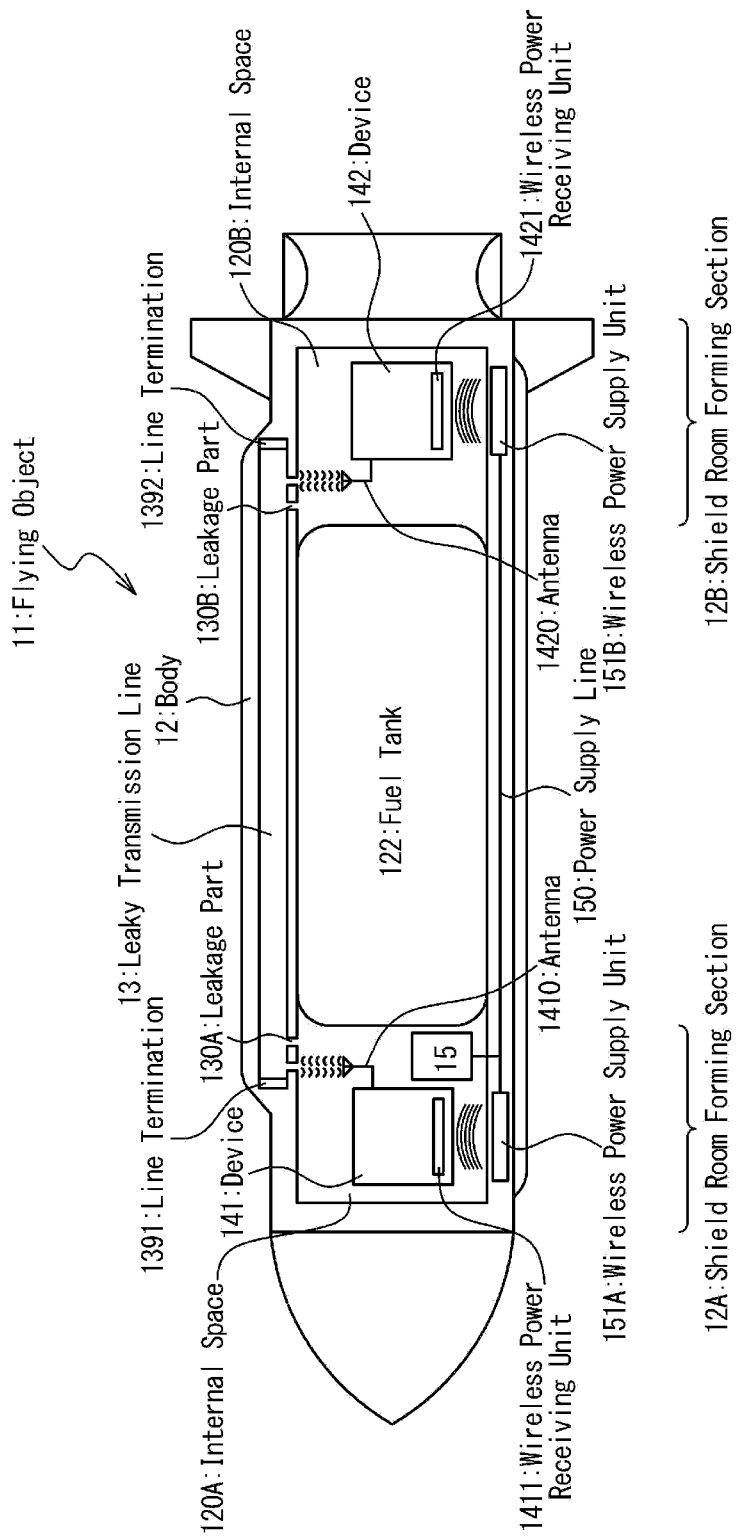
FIG. 4 is a partial cross-sectional view that shows a configuration example of a flying object according to an embodiment.

Next, a flying object 11 according to the present embodiment will be described with reference to FIG. 4. FIG. 4 is a partial cross-sectional view that shows a configuration example of a flying object 11 according to an embodiment.

Components of the flying object 11 in FIG. 4 will be described. The flying object 11 in FIG. 4 is provided with a body 12, a fuel tank 122, a leaky transmission line 13, a first device 141, a second device 142, a power supply 15, a power supply line 150, a first wireless power supply unit 151A and a second wireless power supply unit 151B. The leaky transmission line 13 is provided with leakage parts 130A and 130B and line terminations 1391 and 1392. The first device 141 is provided with a first antenna 1410 and a first wireless power receiving unit 1411. Similarly, the second device 142 is provided with a second antenna 1420 and a second wireless power receiving unit 1421.

Connection relationships and positional relationships of components of the flying object 11 in FIG. 4 will be described. Similar to the case in FIG. 3, the fuel tank 122 is arranged inside the body 12 and the internal space of the body 12 is physically divided by the fuel tank 122 into the first internal space 120A at the front and the second internal space 120B at the rear. In addition, a part of the body 12 and the fuel tank 122 that covers first internal space 120A can be considered as a pseudo first shield room forming section 12A. Similarly, a part of the body 12 and the fuel tank 122 that covers the second internal space 120B can be considered as a pseudo second shield room forming section 12B. At that time, the first device 141 is arranged in the first internal space 120A and the second device 142 is arranged in the second internal space 120B.

The leaky transmission line 13 and the power supply line 150 are integrated to the body 12. As the positional relationship of the body 12, the leaky transmission line 13 and the power supply line 150 in FIG. 4 is similar to the positional relationship of the shield room forming section 2, the leaky transmission line 3 and the power supply line 50 shown in FIG. 2, further detailed description thereof will be omitted.

The first leakage part 130A is provided so as to penetrate through a part of the body 12 that is sandwiched between the leaky transmission line 13 and the first internal space 120A. The first antenna 1410 is arranged near the first leakage part 130A so as to be able to be in electromagnetic wave coupling with the first leakage part 130A, so as to enable a wireless communication between the first antenna 1410 and the first leakage part 130A in other words.

Similarly, the second leakage part 130B is provided so as to penetrate through a part of the body 12 that is sandwiched between leaky transmission line 13 and the second internal space 120B. The second antenna 1420 is arranged near the second leakage part 130B so as to be able to be in electromagnetic wave coupling with the second leakage part 130B, so as to enable a wireless communication between the second antenna 1420 and the second leakage part 130B, in other words.

The power supply 15 is connected to the first wireless power supply unit 151A and the second wireless power supply unit 151B through the power supply line 150. Although the first wireless power supply unit 151A and the second wireless power supply unit 151B are integrated to the body 12 in the configuration example in FIG. 4, this is merely one configuration example and does not limit configurations of the present embodiment. That is, the power supply 15 may be arranged in any of the first internal space 120A and the second internal space 120B. In addition, the first wireless power supply unit 151A and the second wireless power supply unit 151B may be arranged in the first internal space 120A and the second internal space 120B, respectively. In any case, the first wireless power supply unit 151A is arranged near the first wireless power receiving unit 1411 so as to be able to wirelessly supply power to the first wireless power receiving unit 1411 of the first device 141. Similarly, the second wireless power supply unit 151B is arranged near the second wireless power receiving unit 1421 so as to be able to wirelessly supply power to the second wireless power receiving unit 1421 of the second device 142.

Operations of the components of the flying object 11 in FIG. 4 will be described. Similar to the case of the wireless communication system 1 in FIG. 1, at first, the power supply 15 generates power to transmit to the wireless power supply units 151A and 151B through the power supply line 150. Wireless power supply units 151A and 151B perform wireless power supply to the wireless power receiving units 1411 and 1412 that are arranged at positions where wireless power supply is possible. The wireless power receiving units 1411 and 1421 supply the power that is wirelessly supplied from the wireless power supply units 151A and 151B to internal circuits of the devices 141 and 142 that are not illustrated. Those internal circuits include communication circuits. The internal circuits of the devices 141 and 142, that are not illustrated, start and operate with the power supplied by the wireless power receiving units 1411 and 1421. It should be noted that it is preferable that the devices 141 and 142 are further provided with rechargeable batteries, that are to be charged with the power supplied by the wireless power receiving units 1411 and 1421 and supply the charged power to the internal circuits, and charge-discharge circuits. The devices 141 and 142 in operation perform, as necessary, transmission and reception of signals through antennas 1410 and 1420. The antennas 1410 and 1420 enable two-way communication between other devices 142 and 141 through the leakage parts 130A and 130B, that are in electromagnetic wave coupling, and the leaky transmission line 13.

Moreover, further detailed descriptions will be omitted in that leaky transmission line 13 functions as two-way propagation path, that an access point to mediate a communication is not necessary when a wireless communication is performed between the first device 141 and the second device 142, and that power supply to the first device 141 and the second device 142 may be performed by wire, and the like, because the second embodiment is similar to the case of the first embodiment.

As effects obtained in the present embodiment, it can be mentioned that, in addition to effects obtained in the first embodiment, the problem in that outer part of the flying object 11 is exposed to high heat, electromagnetic noises and the like is resolved because the wire harness 123 of the related art shown in FIG. 3 is no longer necessary. As a result, the design of the flying object 11 as a whole becomes easier. In addition, a reliability of the flying object 11 as a whole is improved because external factors can be reduced.

Third Embodiment

In the first and second embodiments, it was described that an access point to mediate a communication is not necessary when a wireless communication is performed between a plurality of devices 4, 141 and 142. In the present embodiment, it will be described that an access point may be added and that functions can be added by adding an access point.

Figure 5:
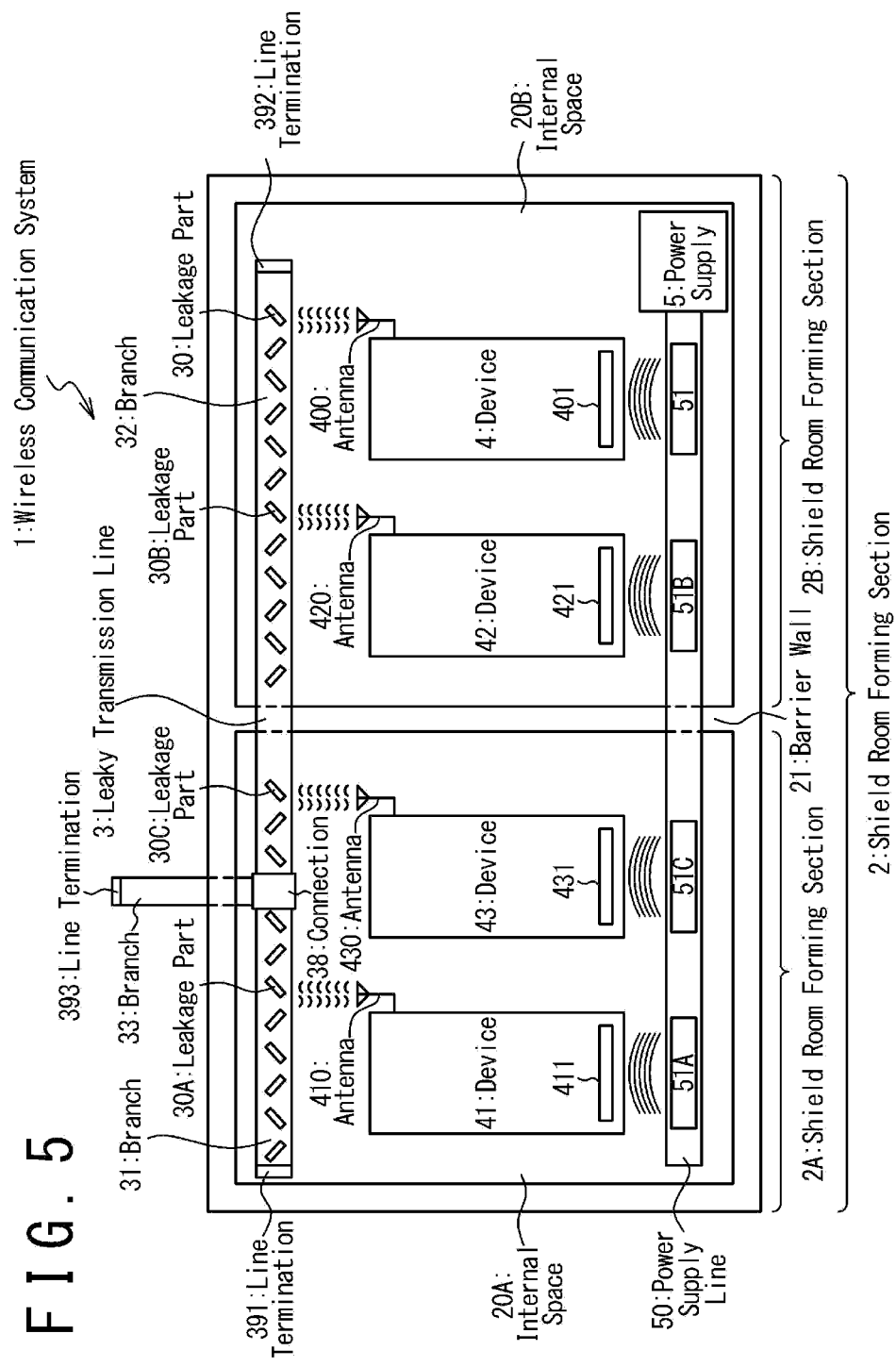
FIG. 5 is a partial cross-sectional view that shows a configuration example of a wireless communication system according to an embodiment.
Figure 6:
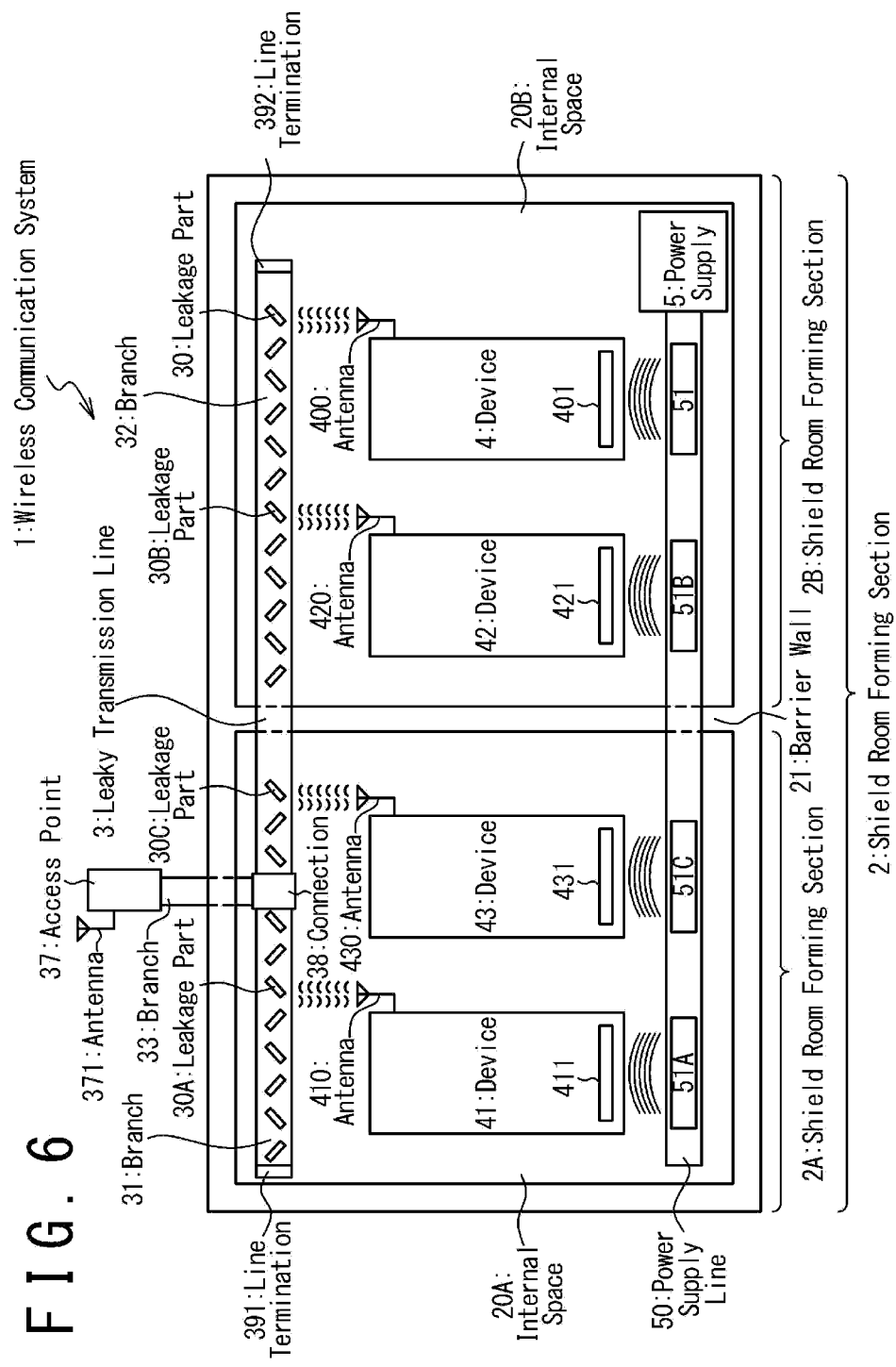
FIG. 6 is a partial cross-sectional view that shows another configuration example of a wireless communication system according to an embodiment.

A wireless communication system 1 according to the present embodiment will be described with reference to FIG. 5 and FIG. 6. FIG. 5 is a partial cross-sectional view that shows a configuration example of a wireless communication system 1 according to an embodiment. FIG. 6 is a partial cross-sectional view that shows another configuration example of a wireless communication system 1 according to an embodiment.

The wireless communication system 1 according to the configuration example in FIG. 5 is equivalent to the wireless communication system 1 in FIG. 1 with a connection 38, a branch 33 and a line termination 393. That is, in FIG. 5, the connection 38 is added between the first line termination 391 and the second line termination 392 of the leaky transmission line 3. This connection 38 is a branch point of the leaky transmission line 3. Herein, for convenience, a part of the leaky transmission line 3 from the connection 38 to the first line termination 391 will be referred to as "a first branch" 31, a part from the connection 38 to the second line termination 392 will be referred to as "a second branch" 32 and a part from the connection 38 to the third line termination 393 will be referred to as "a third branch" 33. In other words, downstream of the third branch 33, there is a third end terminated by the third line termination 393. A part of the third branch 33 that includes an end connected to the connection 38 is arranged inside the shield room forming section 2, while a remaining part including the third line termination 393 penetrates through the shield room forming section 2 and is arranged outside the shield room forming section 2. The end of the third branch 33 that is arranged outside the shield room forming section 2 may be referred to as "an external end". Similarly, the third line termination 393 may be referred to as "an external line termination". Description of features and elements appearing in FIG. 5 that have been previously described in earlier drawings has been omitted.

The wireless communication system 1 according to the configuration example in FIG. 6 is equivalent to the wireless communication system 1 in FIG. 5 without the third line termination 393 of FIG. 5 removed from the third branch 33 and with an access point 37 connected to an end of the third branch 33 instead. In other words, the third line termination 393 is detachably attached to the end of the third branch 33 and can be replaced by the access point 37. The access point 37 is provided with an antenna 371. The access point 37 and the antenna 371 are arranged outside the shield room forming section 2. In other words, the access point 37 can perform a wireless communication with an arbitrary communication device existing outside the wireless communication system 1 via the antenna 371 thereof. On the other hand, the access point 37 can perform a wireless communication with the device 4 arranged in the shield room forming section 2 via the leaky transmission line 3. Description of features and elements appearing in FIG. 6 that have been previously described in earlier drawings has been omitted.

In other words, in the wireless communication system 1 according to the present embodiment, a contactless wireless communication can be performed between a device 4 existing in an internal space 20A or 20B shielded by an electromagnetic wave reflector and an arbitrary communication device existing outside the shield room forming section 2. The wireless communication system 1 according to the present embodiment will be described as a specific example when applied to the flying object 11 in FIG. 4 in this regard.

In general, a flying object 11 may be subjected to a test before being used. When performing a test, by connecting a relay device corresponding to the access point 37 to the leaky transmission line 3, a wireless communication can be performed between an arbitrary checking device, that is prepared outside the flying object 11 and connected to the relay device, and the devices 141 and 142 via the relay device. As a result, function check, program update and the like can be performed to the devices 141 and 142 without physically manipulating the devices 141 and 142 inside the body 12.

It should be noted that after the test is completed the relay device corresponding to the access point 37 can be removed from the leaky transmission line 3 and an arbitrary terminating device corresponding to the line termination 393 can be connected instead as shown in FIG. 5.

Although the invention made by the inventor(s) has been specifically described above based on embodiments, it is needless to say that the present invention is not limited by the above described embodiments and various modifications can be made thereto without departing from the scope thereof. In addition, each feature described in the above described embodiments can be freely combined as long as there is no technical contradiction.

It should be noted that the present application claims priority based on Japanese Patent Application No. 2018-033872 filed on Feb. 27, 2018 and herein incorporates all disclosure thereof by reference.

The invention claimed is:
1. A wireless communication system comprising:
a shield room forming section configured to form an internal space with an electromagnetic wave reflector so as to block wireless communication from outside of the shield room forming section;
a leaky transmission line arranged inside the shield room forming section and comprising a plurality of leakage parts;
a plurality of antennas arranged inside the shield room forming section and configured to be wirelessly communicable with the plurality of leakage parts; and
a plurality of communication devices arranged inside the shield room forming section and having the plurality of antennas, wherein the plurality of antennas comprises:
a first antenna arranged inside the shield room forming section and configured to be wirelessly communicable with a first leakage part included in the plurality of leakage parts;
a second antenna arranged inside the shield room forming section and configured to be wirelessly communicable with a second leakage part included in the plurality of leakage parts; and
wherein the plurality of communication devices comprises:
a first device arranged inside the shield room forming section and having the first antenna; and
a second device arranged inside the shield room forming section and having the second antenna,
wherein the first device and the second device perform a direct two-way communication through the leaky transmission line, and
wherein a number of the plurality of leakage parts is greater than a number of the plurality of antennas.

2. The wireless communication system according to claim 1,
wherein the shield room forming section comprises:
a barrier wall configured to divide the internal space into a first shield room, formed by a first shield room forming section, that includes the first device, the first antenna and the first leakage part, and a second shield room, formed by a second shield room forming section, that includes the second device, the second antenna and the second leakage part,
wherein the leaky transmission line penetrates through the barrier wall.

3. The wireless communication system according to claim 2, further comprising a third shield room forming section configured to form a third internal space different from a first internal space formed by the first shield room forming section and a second internal space formed by the second shield room forming section, with the electromagnetic wave reflector,
wherein the plurality of leakage parts further comprises a third leakage part arranged inside the third shield room forming section,
wherein the plurality of antennas further comprises:
a third antenna arranged inside the third shield room forming section and configured to be wirelessly communicable with the third leakage part, and
wherein the plurality of communication devices further comprises:
a third device arranged inside the third shield room forming section and connected to the third antenna.

4. The wireless communication system according to claim 1,
wherein the shield room forming section comprises:
a barrier wall configured to divide the internal space into a first shield room, formed by a first shield room forming section, that includes the first device, the first antenna and the first leakage part, and a second shield room, formed by a second shield room forming section, that includes the second device, the second antenna and the second leakage part,
wherein the leaky transmission line detours around the barrier wall.

5. The wireless communication system according to claim 4, further comprising a third shield room forming section configured to form a third internal space different from a first internal space formed by the first shield room forming section and a second internal space formed by the second shield room forming section, with the electromagnetic wave reflector,
wherein the plurality of leakage parts further comprises a third leakage part arranged inside the third shield room forming section,
wherein the plurality of antennas further comprises:
a third antenna arranged inside the third shield room forming section and configured to be wirelessly communicable with the third leakage part, and
wherein the plurality of communication devices further comprises:
a third device arranged inside the third shield room forming section and connected to the third antenna.

6. The wireless communication system according to claim 1, wherein the leaky transmission line has a plurality of ends, and all ends of the leaky transmission line are terminated.

7. The wireless communication system according to claim 6,
wherein the leaky transmission line further comprises:
an external end among the all ends, the external end being arranged outside the electromagnetic wave reflector; and
an external line termination removably mounted to the external end to terminate the external end.

8. The wireless communication system according to claim 1,
wherein the leaky transmission line further comprises a leaky coaxial cable,
wherein the leaky coaxial cable is provided with the plurality of leakage parts, and
wherein the leaky coaxial cable comprises:
a center conductor;
a dielectric arranged around the center conductor; and
an external conductor arranged around the dielectric and integrated with the electromagnetic wave reflector.

9. The wireless communication system according to claim 1,
wherein the leaky transmission line comprises a leaky waveguide,
wherein the leaky waveguide is provided with the plurality of leakage parts, and
wherein the leaky waveguide is integrated with the electromagnetic wave reflector.

10. The wireless communication system according to claim 1, further comprising:
a power supply; and
a wireless power supply unit connected by wire to the power supply to wirelessly supply power to the first device and arranged inside the electromagnetic wave reflector,
wherein the first device further comprises a wireless power receiving unit arranged so as to be wirelessly powered by the wireless power supply unit.

11. A flying object comprising the wireless communication system according to claim 1.

12. A wireless communication system comprising:
a first shield room forming section configured to form a first internal space with an electromagnetic wave reflector so as to block wireless communication from outside of the first shield room forming section;
a second shield room forming section configured to form a second internal space, that exists separately and independently from the first shield room forming section, with the electromagnetic wave reflector;

a leaky transmission line comprising a plurality of leakage parts arranged inside the first shield room forming section and the second shield room forming section;

a plurality of antennas arranged inside the first shield room forming section and the second shield room forming section and configured to be wirelessly communicable with the plurality of leakage parts; and a plurality of communication devices arranged inside the first shield room forming section and the second shield room forming section and comprising the plurality of antennas, wherein the plurality of leakage parts comprises:

a first leakage part arranged inside the first shield room forming section; and a second leakage part arranged inside the second shield room forming section, wherein the plurality of antennas comprises:

a first antenna arranged inside the first shield room forming section and configured to be wirelessly communicable with the first leakage part; and a second antenna arranged inside the second shield room forming section and configured to be wirelessly communicable with the second leakage part, wherein the plurality of communication devices comprises:

a first device arranged inside the first shield room forming section and having the first antenna; and a second device arranged inside the second shield room forming section and having the second antenna, wherein the first device and the second device perform a direct two-way communication through the leaky transmission line, and wherein a number of the plurality of leakage parts is greater than a number of the plurality of antennas.

13. The wireless communication system according to claim 12, further comprising a third shield room forming section configured to form a third internal space different from a first internal space formed by the first shield room forming section and a second internal space formed by the second shield room forming section, with the electromagnetic wave reflector, wherein the plurality of leakage parts further comprises a third leakage part arranged inside the third shield room forming section, wherein the plurality of antennas further comprises:

a third antenna arranged inside the third shield room forming section and configured to be wirelessly communicable with the third leakage part, and wherein the plurality of communication devices further comprises:

a third device arranged inside the third shield room forming section and connected to the third antenna.

* * * * *